United States Patent [19]

Wu et al.

[11] Patent Number: 4,793,697

[45] Date of Patent: Dec. 27, 1988

[54] PLZT SHUTTER WITH MINIMIZED SPACE CHARGE DEGRADATION

[75] Inventors: Adam Y. Wu; Krupanidhi B. Saluru, both of Albuquerque, N. Mex.; Rickey G. Pastor, Chicago, Ill.

[73] Assignee: Motorola, Inc., Schaumburg, Ill.

[21] Appl. No.: 892,550

[22] Filed: Aug. 4, 1986

[51] Int. Cl.$^4$ .............................................. G02F 1/03
[52] U.S. Cl. ................................... 350/393; 350/392; 350/397
[58] Field of Search ........ 350/356, 387, 390, 392–393, 350/397

[56] References Cited

U.S. PATENT DOCUMENTS

| | | | |
|---|---|---|---|
| 3,531,182 | 9/1970 | Land et al. | |
| 3,626,317 | 12/1971 | Dakss et al. | 350/392 |
| 3,709,586 | 1/1973 | Lipp | 350/397 |
| 3,868,172 | 2/1975 | Ii et al. | 350/388 |
| 4,120,560 | 10/1978 | Baues et al. | 350/96.14 |
| 4,270,847 | 6/1981 | Meyer | 350/392 |
| 4,367,925 | 1/1983 | Sprague et al. | 350/355 |
| 4,391,490 | 7/1983 | Hartke | 350/356 |
| 4,396,246 | 8/1983 | Holman | 350/96.14 |
| 4,396,252 | 8/1983 | Turner | 350/355 |
| 4,533,217 | 8/1985 | Samek | 350/397 |

FOREIGN PATENT DOCUMENTS

| | | |
|---|---|---|
| 82300161.5 | 1/1982 | European Pat. Off. . |
| 0056334 | 7/1982 | European Pat. Off. . |
| 84900750.5 | 2/1984 | European Pat. Off. . |
| 0137851 | 4/1985 | European Pat. Off. . |
| 2429813 | 1/1975 | Fed. Rep. of Germany . |
| 2434443 | 2/1983 | Fed. Rep. of Germany . |
| 53-50689 | 9/1978 | Japan . |
| 57-173804 | 10/1982 | Japan . |
| 57-182719 | 11/1982 | Japan . |
| 58-107516 | 6/1983 | Japan . |
| 58-169128 | 10/1983 | Japan . |
| 59-17510 | 1/1984 | Japan . |
| 59-30507 | 2/1984 | Japan . |
| 59-30508 | 2/1984 | Japan . |
| 59-44004 | 3/1984 | Japan . |
| 855593 | 8/1981 | U.S.S.R. ............... 350/392 |

OTHER PUBLICATIONS

Haertling, "PLZT Electrooptic Ceramics and Devices," *American Chemical Society Symposium Series,* No. 164, (1981), pp. 265-283.

Ashley et al., "Improved Mode Extinction Modulator Using a Ti In-Diffused LiNbO$_3$ Channel Waveguide," *Applied Physics Letters,* vol. 45, No. 8, pp. 840-842, Oct. 15, 1984.

Masuda et al., "Effects of a Buffer Layer on TM Modes in a Metal-Clad Optical Waveguide," *Applied Optics,* vol. 16, No. 11, Nov. 1977, pp. 2994-3000.

Mitsunaga et al., "Optical LiNbO$_3$ 3-Branched Waveguide and its Applications," *Applied Optics,* vol. 19, No. 22, Nov. 15, 1980, pp. 3837-3842.

Hacking et al., "Digital Recording Using Hologram Arrays: Laser-Beam Deflection & Modulation" British Broadcasting Corp. Research Dept. Report BBC RD 1979/6, 3-1979, pp. 19, 21, 26-31.

Hacking et al., "Digital Recording Using Hologram Arrays; Development of the Transducers for an Experimental 100 mbit/s Recorder" British Broadcasting Corp., Research Dept. Report BBC RD 1979/16, pp. 4-6.

Klimov et al., "Investigation of the Possibility of Constructing of a Matrix-Addressable Controlled Transparency Based on PLZT Ceramics", SOVJR Quantum Electronics, 11-1977, pp. 1349-1352.

Jacobs et al., "Ferroelectric Devices" IBM Tech. Disc. Bull., 1-1973, pp. 2403-2404.

Rouchon et al., "Electrooptical Properties & Photoinduced Effects in PLZT Ceramics Applications to Optical Storage & Processing of Information", Czech. J. Phys. B 1975, #5, pp. 575-584.

*Primary Examiner*—John K. Corbin
*Assistant Examiner*—Martin Lerner
*Attorney, Agent, or Firm*—Charles L. Warren

[57] ABSTRACT

A transparent film of material is deposited on a PLZT plate used in a light modulator. The film is substantially less resistive than the PLZT plate and prevents light leakage in the OFF state due to space-charge accumulation. Suitable materials include SiO$_2$ and TiO$_2$.

20 Claims, 1 Drawing Sheet

PLZT SHUTTER WITH MINIMIZED SPACE CHARGE DEGRADATION

BACKGROUND OF THE INVENTION

This invention relates to PLZT shutters such as utilized in light modulators and displays, and more specifically relates to space-charge problems associated with such devices.

PLZT is an abbreviation for a lanthanum modified lead zirconate-lead titanate ferroelectric ceramic material which is optically transparent This material and its application as a shutter or light modulator is generally well known; for example, see the article entitled "PLZT Electrooptic Ceramics and Devices" by Dr. Gene H. Haertling, ACS Symposium Series No. 164, Industrial Applications of Rare Earth Elements, 1981. By controlling the magnitude of an electric field induced in a plate of PLZT disposed between two crossed polarizers, a shutter can be switched between ON and OFF states.

External light entering a PLZT shutter is polarized by the first polarizer and, with no electric field applied to the PLZT plate, strikes the second crossed polarizer substantially out of phase so that virtually no light is transmitted through the second polarizer. This defines the OFF state. Applying an electric field to the PLZT plate causes a phase retardation of the polarized light passing through it. By providing a phase retardation of approximately 90°, the polarized light is substantially in phase with the second polarizer and easily passes through it. This corresponds to the ON state.

Operation of a PLZT shutter, especially for long periods of time in the ON state, may result in an undesired condition wherein the removal of the externally induced electric field o the PLZT plate does not cause the shutter to completely turn OFF. Varying amounts of light leakage through the shutter usually in irregular patterns or locations result thereby lowering the ON-OFF ratio and creating problems in applications where light transmission in the OFF state must be very low. This problem is hereinafter referred to as a space-charge problem.

SUMMARY OF THE INVENTION

It is an object of this invention to minimize space-charge problems encountered with PLZT shutters. An additional objective of the present invention is to minimize the magnitude of the electric field needed to achieve a suitable ON state.

In one embodiment of the present invention a thin layer of transparent slightly conductive (relative to the conductivity of PLZT) material is disposed on the surface of the PLZT plate prior to the deposition of a conductive electrode pattern used to induce an electric field on the PLZT plate. In another embodiment of the present invention, such a film is disposed over the PLZT plate and the conductive electrode pattern to form an overcoat.

BRIEF DESCRIPTION OF THE DRAWINGS

In the drawings like reference numerals in the various figures denote common elements.

DETAILED DESCRIPTION

Figure 1:
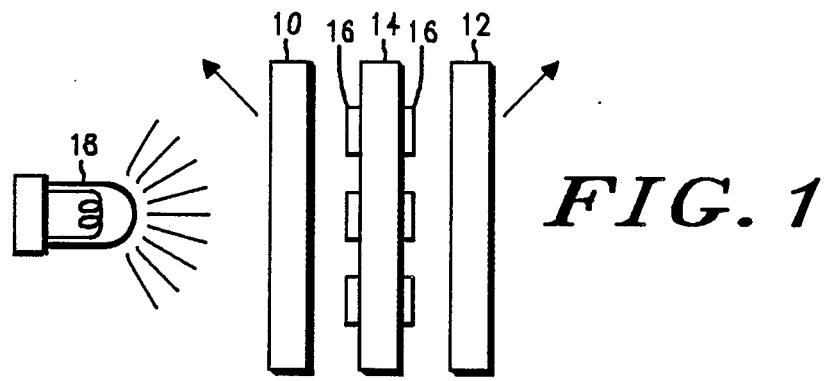
FIG. 1 is a diagrammatic illustration of a PLZT light shutter in accordance with the present invention.

FIG. 1 illustrates a light shutter or modulator consisting of crossed polarizers 10 and 12, and an electrooptic plate 14 such as made of PLZT having electrodes 16 disposed on its two major surfaces. The purpose of the shutter is to modulate or control the amount of light emitted by source 18 which can pass through the shutter. A plate 14 of PLZT can be operated in the transverse mode in which electric fields induced parallel to the major surfaces of the plate are utilized to provide controlled phase retardation of the light emitted from source 18. If no electric field is applied, the polarized light exiting polarizer 10 will pass through plate 14 with substantially no phase change and hence will be substantially orthogonal to the polarity of polarizer 12 such that light is not transmitted through polarizer 12. When electric fields having a magnitude needed to cause approximately 90° of phase retardation are applied to the surfaces of plate 14, the polarized light exiting polarizer 10 will undergo a phase change while passing through plate 14 so that the light striking polarizer 12 will be substantially in phase with the polarity of polarizer 12 and hence the light will pass substantially unimpeded by polarizer 12. By controlling the electric fields applied to plate 14, various phase orientations relative to the polarization of polarizer 12 can be achieved so that variations in light intensity exiting polarizer 12 can be controlled.

One of the important aspects of the present invention is the discovery of the source of the space-charge problem. This problem is most likely to occur after periods of long use in which electric fields have been applied to the PLZT plate After removing the external voltage applied to the electrodes on the PLZT plate to create the electric fields, various irregular areas of charge, especially adjacent the electrodes on the PLZT plate, provide an electric field sufficient to cause phase retardation. This causes light leakage in the OFF state through the shutter in such charged areas. The space-charge problem generally degrades the ON and OFF states of the shutter and reduces the ON/OFF ratio.

A case of space-charge problem has been determined to be associated with surface defects such as roughness and contamination It is believed that such defects act as trapping centers for free charge carriers such as electrons, and ionized or charged $H_2O$, $O_2$, $N_2$ or dust. The present invention utilizes a transparent dielectric coating which has a resistivity less than the resistivity of the PLZT plate to cure the space-charge problem. It has been found that such a film disposed between the PLZT and electrodes, or as an overcoat after the electrodes are disposed on the PLZT, improve the shutter's performance by substantially eliminating the space-charge problem. It is believed that the film bleeds-off the areas of localized accumulated charge due to the conductivity of the film.

Figure 2:
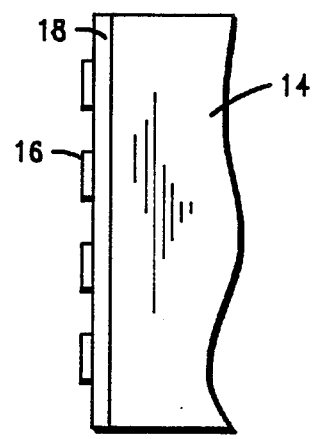
FIGS. 2, 3, 4 and 5 are partial side elevational views of one of the major surfaces of a PLZT plate having films disposed thereon in accordance with the present invention.

FIG. 2 is a partial side elevational view of a PLZT plate 14 in which a film 18 has been disposed between the PLZT plate 14 and the electrodes 16. It will be understood that although only one major surface of the PLZT plate is shown, the other opposite major surface would be identical. The film 18 may consist of silicon dioxide ($SiO_2$) which is deposited on the surface of the PLZT plate 14 so that it has a resistivity less than that of the PLZT. For example, a resistivity in the range of $10^9$–$10^{10}$ ohm-cm would be suitable. The PLZT has a resistivity of approximately $10^{13}$–$10^{14}$ ohm-cm.

Although film 18 can consist of any material having the desired characteristics as explained above, films made of $SiO_2$ and $TiO_2$ have proved suitable. The electrodes 16 can be formed on film 18 by depositing a suitable conductive electrode material such as chromium coated with gold and then etching the desired electrode pattern using conventional photolithographic techniques.

EXAMPLE 1

A film 18 of $SiO_2$ can be deposited upon the surface of PLZT plate 14 by E-beam deposition. The PLZT plate 14 is placed in a vacuum chamber which is evacuated to approximately $10^{-7}$ Torr and the temperature of the chamber is elevated to approximately 180° C. Oxygen ($O_2$) is introduced so that the pressure in the chamber is approximately $10^{-4}$ Tor. The approximate deposition rate of $SiO_2$ onto the PLZT plate is approximately 2-5 angstroms per second. The preferred thickness of the film is approximately 2000 angstroms in order to minimize reflections. A target of SiO or $SiO_2$ can be utilized. Depending upon the particular E-beam system, the above parameters may have to be modified to yield a $SiO_2$ film having the desired resistivity which is in the range of $5 \times 10^9$–$10^{11}$ ohm-cm.

EXAMPLE 2

A suitable film 18 of $SiO_2$ material can also be deposited by a liquid solution technique. The PLZT plate 14 should be cleaned such as by using trichloroethylene, acetone and alcohol. Following the cleaning, the PLZT plate should be baked in an oven at approximately 120° C. for ten minutes in an ambient atmosphere environment The PLZT plate is then placed upon a turntable and spun at between 3000-5000 RPM. A solution of highly pure $Si(OH)_4$ solution, such as available from Hitachi Chemical Company America, Ltd., known as HSG-1000, is dropped onto the spinning plate and the plate is continued to be spun for approximately 20 seconds. The plate is then baked in an oven at 100° C. for approximately 10-30 minutes in an atmospheric environment and is then fired at approximately 350° C.-450° C. for approximately 20-30 minutes in an atmospheric environment. The preferred thickness and resistivity is as indicated in Example 1.

EXAMPLE 3

The film 18 can also consist of a film of $TiO_2$ which can be deposited by a spin coating technique. The PLZT plate is initially cleaned such as described in Example 2. A solution is formed by diluting titanium butoxide, $Ti(C_4H_9O)_4$ such as available from Alfa Products as Stock No. 77124, and is diluted to approximately 2-5 percent with isobutanol solution, $(CH_3)_2CH CH_2OH$ such as available from Alfa Products as Stock No. 13777. This solution is dropped onto the PLZT plate and spun at between 3000-5000 RPM for 20 seconds. The plate is then fired at approximately 400° C. for 20 minutes. A resistivity within the desired resistivity range can be attained using this technique.

Figure 3:
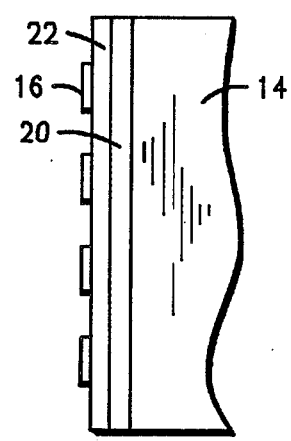

FIG. 3 illustrates another embodiment of the present invention in which two films 20 and 22 are disposed between PLZT plate 14 and electrodes 16. The purpose of the combined films 20 and 22 is similar to that of the single film 18, i.e. the elimination of the space-charge problem.

EXAMPLE 4

Films 20 and 22 can consist of zirconium oxide ($ZrO_2$) and $SiO_2$, respectively. The PLZT plate is preferably cleaned in accordance with the Example 1 prior to the depositing of the films. The film 20 can be deposited by E-beam deposition by utilizing a $ZrO_2$ target in a vacuum chamber which has been first evaluated to approximately $10^{-7}$ Torr, heated to 180° C., and oxygen introduced to reduce the vacuum to approximately $10^{-4}$ Torr. The deposition rate is approximately 2-5 angstroms per second and the preferred thickness is approximately 1600 angstroms. The film 22 of $SiO_2$ is then deposited as previously explained with respect to Example 1. The preferred thickness for film 22 is approximately 400 angstroms, thus making the total thickness of both films 2000 angstroms.

EXAMPLE 5

Alternatively, film 20 and 22 can consist of $TiO_2$ and $SiO_2$, respectively. The $TiO_2$ film can be formed as described with respect to film 18 in Example 3. The preferable thickness of film 20 is approximately 1700 angstroms. Film 22 can then be formed as described with respect to film 18 in Example 2 except that film 22 is preferably approximately 300 angstroms thick.

Figure 4:
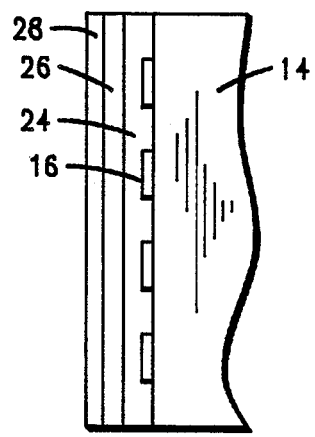

FIG. 4 illustrates another embodiment of the present invention in which an overcoat film 24 is utilized over electrodes 16 and PLZT plate 14. An adhesive layer 26 is utilized to bond a protective glass plate 28 to the PLZT plate to minimize possible degradation of film 24 by environmental contaminants.

EXAMPLE 6

Film 24 can consist of $SiO_2$ which is deposited in the same manner as the $SiO_2$ film 18 as described in Example 2. Before the $SiO_2$ film 24 has cooled down to room temperature, a layer of adhesive sealant which is ultra violet curable, such as part No. X92326 manufactured by Locktite Corporation, is applied over the $SiO_2$ layer and a clean glass plate is immediately seated upon the adhesive layer 26. This assembly is then cured for approximately 5-10 minutes using an ultra violet light source to cure the adhesive. It has been found that the space-charge problem can also be substantially obviated by overcoating the PLZT plate and electrodes.

EXAMPLE 7

Film 24 can consist of $TiO_2$ which is deposited as explained above with respect to film 18 and Example 3. The adhesive layer 26 and glass plate 28 are utilized following the depositing of film 24 as explained in Example 6

Figure 5:
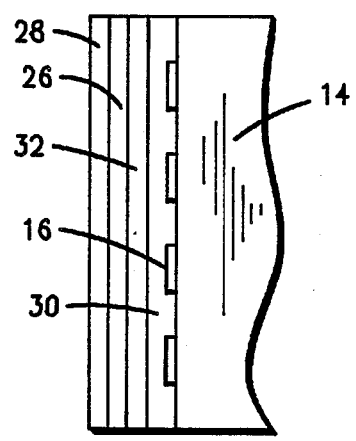

FIG. 5 illustrates another embodiment of the present invention in which two films 30 and 32 are applied as an overcoat over the electrodes 16 and PLZT plate 14. An ultra violet curable adhesive layer 26 is used to seal a glass plate 28 as described with respect to FIG. 4

EXAMPLE 8

Film 30 can consist of $ZrO_2$ and film 32 can consist of $SiO_2$. Film 30 and 32 can be deposited like films 20 and 22, respectively, as explained with respect to Example 4. The adhesive layer 26 and glass 28 can be utilized as explained with regard to Example 6.

EXAMPLE 9

Film 30 and 32 can consist of $TiO_2$ and $SiO_2$, respectively, and can be deposited as explained with respect to films 20 and 22 as explained in Example 5. The adhesive layer 26 and glass 28 can be utilized as explained with regard to Example 6.

In addition to solving the space-charge problem associated with the PLZT plate, it has been discovered that the films utilized with the present invention reduce the half-wave operating voltage of the PLZT plate by approximately 15–30 percent. It has been discovered that the undercoat films such as shown in FIGS. 2 and 3 provide greater half-wave voltage reductions than the overcoat films as shown in FIGS. 4 and 5. Thus, the voltage applied to the electrodes 16 to obtain a certain degree of phase retardation in the ON state is less than the voltage which would be required without the film. Undercoat and overcoat films can also be used concurrently. Further, by utilizing films having a refractive index of about the square root of 2.5 (refractive index of PLZT is 2.5) the light reflection loss can be minimized.

Although embodiments of the present invention have been described and illustrated in the figures, the scope of the present invention is defined by the claims appended hereto.

What is claimed is:

1. A light modulator comprising:
   (a) first and second spaced-apart polarizers;
   (b) transparent ferroelectric PLZT disposed between said first and second polarizers;
   (c) means for inducing an electric field in said plate, said inducing mans including electrodes; and
   (d) means for minimizing space-charge on the surface of said plate, said minimizing means comprising at least a first film of substantially transparent material disposed on said plate and having a resistivity less than 0.1 times the resistivity of the plate.

2. The light modulator according to claim 1 wherein said film has a resistivity less than 0.01 times the resistivity of the plate.

3. The light modulator according to claim 2 wherein said plate is made of PLZT and said film has a resistivity within the range of $5 \times 10^9$ to $10^{11}$ ohm-cm 4. The light modulator according to claim 3 wherein said material is selected from the group consisting of silicon dioxide and titanium dioxide.

5. The light modulator according to claim 1 wherein said material is selected from the group consisting of silicon dioxide and titanium dioxide.

6. The light modulator according to claim 1 wherein said inducing means comprises first and second electrodes on one surface of said plate for inducing an electric field parallel to said surface.

7. The light modulator according to claim 1 wherein said film is disposed between said electrodes and said plate to define an undercoat.

8. The light modulator according to claim 7 wherein said material is selected from the group consisting of silicon dioxide and titanium dioxide.

9. The light modulator according to claim 1 wherein said electrodes are disposed on said plate and said film is deposited over said electrodes and plate to form an overcoat.

10. The light modulator according to claim 9 wherein said material is selected from the group consisting of silicon dioxide and titanium dioxide.

11. The light modulator according to claim 1 further comprising a second film of substantially transparent material disposed on said first film.

12. The light modulator according to claim 11 wherein said first film comprises zirconium dioxide and said second film comprises silicon dioxide.

13. The light modulator according to claim 11 wherein said first film comprises titanium dioxide and said second film comprises silicon dioxide.

14. A method for minimizing space-charge on the surface of a transparent ferroelelectric PLZT in which electric fields are induced, said method comprising the steps of:
   depositing a first film of substantially transparent material on said plate, said film having a resistivity of less than 0.1 times the resistivity of the plate; and
   depositing electrodes upon said first film for inducing said electric fields, said first film forming an undercoat which is substantially more conductive than said plate thereby providing a path for discharging the space-charges.

15. The method according to claim 14 wherein said first film is selected from the group consisting of silicon dioxide and titanium dioxide.

16. The method according to claim 14 wherein the resistivity of said first film is less than 0.01 times the resistivity of the plate.

17. The method according to claim 14 wherein the plate is made of PLZT and the resistivity of said first film is within the range of $5 \times 10^9$ to $10^{11}$ ohm-cm.

18. The method according to claim 14 wherein the step of depositing the first film further comprises the steps of disposing a liquid solution from which silicon dioxide will be formed on said plate, spinning said plate with said solution disposed thereon to distribute the solution, and heating the spun plate to cure the silicon dioxide film.

19. A method for minimizing space-charge on the surface of a transparent ferroelectric PLZT plate in which electric fields are induced, said method comprising the steps of:
   depositing electrodes on said plate for inducing said electric fields; and
   depositing a first film of substantially transparent material upon said plate and electrodes, said film having a resistivity of less than 0.1 times the resistivity of the plate, whereby the resistivity of said first film provides a path for discharging the space-charges.

20. The method according to claim 19 wherein the plate is made of PLZT and the resistivity of said film is within the range of $5 \times 10^9$ to $10^{11}$ ohm-cm, and the film is selected from the group consisting of silicon dioxide and titanium dioxide.

* * * * *

UNITED STATES PATENT AND TRADEMARK OFFICE
CERTIFICATE OF CORRECTION

PATENT NO. : 4,793,697
DATED : December 27, 1988
INVENTOR(S) : Wu et al.

It is certified that error appears in the above-identified patent and that said Letters Patent is hereby corrected as shown below:

In claim 1, column 5, line 31, insert the word

--plate-- between the words "PLZT" and "disposed".

Signed and Sealed this

Thirteenth Day of June, 1989

Attest:

DONALD J. QUIGG

*Attesting Officer*   *Commissioner of Patents and Trademarks*